June 10, 1924.
H. A. S. HOWARTH
OIL DISTRIBUTING MEANS
Filed Sept. 23, 1921
1,496,850
3 Sheets-Sheet 1

Inventor
Harry A. S. Howarth
By Mauro, Cameron, Lewis & Massie
Attorneys

June 10, 1924.

H. A. S. HOWARTH

OIL DISTRIBUTING MEANS

Filed Sept. 23, 1921

Inventor
Harry A. S. Howarth

By Mauro, Cameron, Lewis & Kerkam
Attorneys

June 10, 1924.

H. A. S. HOWARTH 1,496,850

OIL DISTRIBUTING MEANS

Filed Sept. 23, 1921   3 Sheets-Sheet 3

Inventor
Harry A. S. Howarth

By Mauro, Cameron, Lewis & Kerkam,
Attorneys

Patented June 10, 1924.

1,496,850

UNITED STATES PATENT OFFICE.

HARRY A. S. HOWARTH, OF PITTSBURGH, PENNSYLVANIA, ASSIGNOR TO ALBERT KINGSBURY, OF PHILADELPHIA, PENNSYLVANIA.

OIL-DISTRIBUTING MEANS.

Application filed September 23, 1921. Serial No. 502,748.

*To all whom it may concern:*

Be it known that I, HARRY A. S. HOWARTH, a citizen of the United States, and a resident of Pittsburgh, Pennsylvania, have invented new and useful Improvements in Oil-Distributing Means, which invention is fully set forth in the following specification.

This invention relates to bearings for horizontal or inclined shafts and, more particularly, to means for securing an adequate supply of lubricant to the bearing members.

An object of this invention is to provide a bearing for horizontal or inclined shafts, having an oil well communicating therewith in which the level of the oil is maintained below the level of the shaft, with means whereby the rotation of the thrust collar will maintain the chamber or chambers in which the bearing members are disposed partly or entirely filled with oil and whereby, if desired, the oil in said chamber or chambers may be maintained under a pressure sufficient to cause its circulation through an oil-cooling device or one or more guide bearings or both.

Another object of this invention is to provide a bearing for horizontal or inclined shafts with means as just characterized which is available for use with either direction of shaft rotation and which is also preferably actuated automatically, as by the flow of oil induced by the rotation of said thrust collar or by the direction of rotation of the thrust collar or by both, to assume the proper position with respect to said thrust collar whether the latter rotates in one direction or the other.

Other objects will appear as the description of the invention proceeds.

Stated broadly, the invention comprises a bearing for horizontal or inclined shafts having a rotatable thrust collar, one or more bearing members cooperating therewith, a housing surrounding said thrust collar and including one or more chambers in which said bearing members are disposed, an oil well communicating through a passage with the space between the periphery of said thrust collar and said housing, and means in said space coacting with said thrust collar whereby the rotation of said thrust collar creates a suction which will draw oil from said oil well and deliver it to said chamber or chambers to maintain the latter partly or entirely filled with oil. Said means preferably includes valve mechanism which is automatically reversible as the direction of rotation of the shaft is reversed, so that said thrust collar will draw oil from said oil well and maintain said chamber or chambers partly or entirely filled with oil in whichever direction said shaft may rotate.

The invention is capable of receiving a variety of mechanical expressions, three of which are shown on the accompanying drawings, but it is to be expressly understood that the drawings are for purposes of illustration only and are not to be construed as a definition of the limits of the invention, reference being had to the appended claims for that purpose.

Referring in detail to said drawings, wherein the same reference characters are employed to designate corresponding parts in the several figures:—

Figure 1:
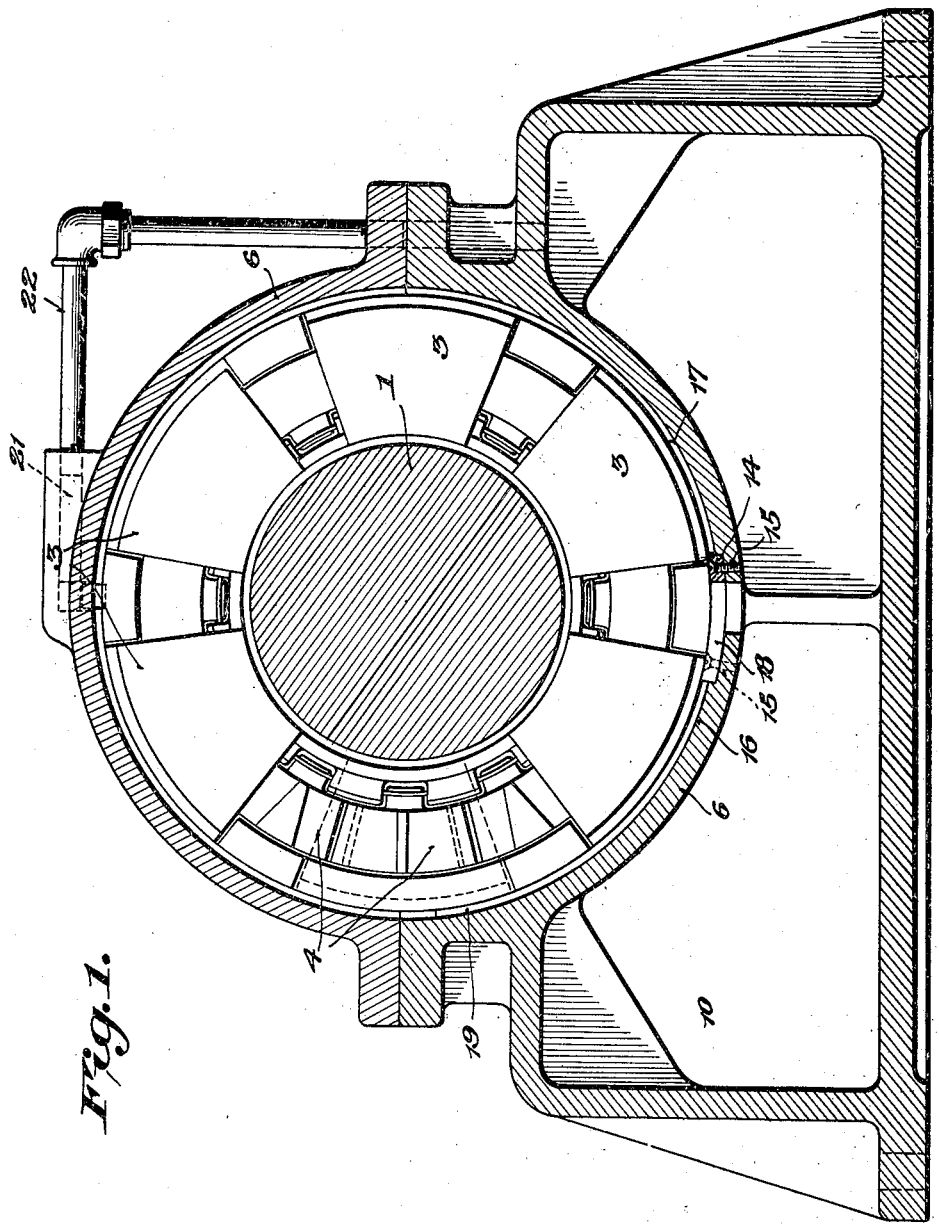
Fig. 1 is a transverse section, partly in elevation, of a thrust bearing embodying the present invention.
Figure 2:
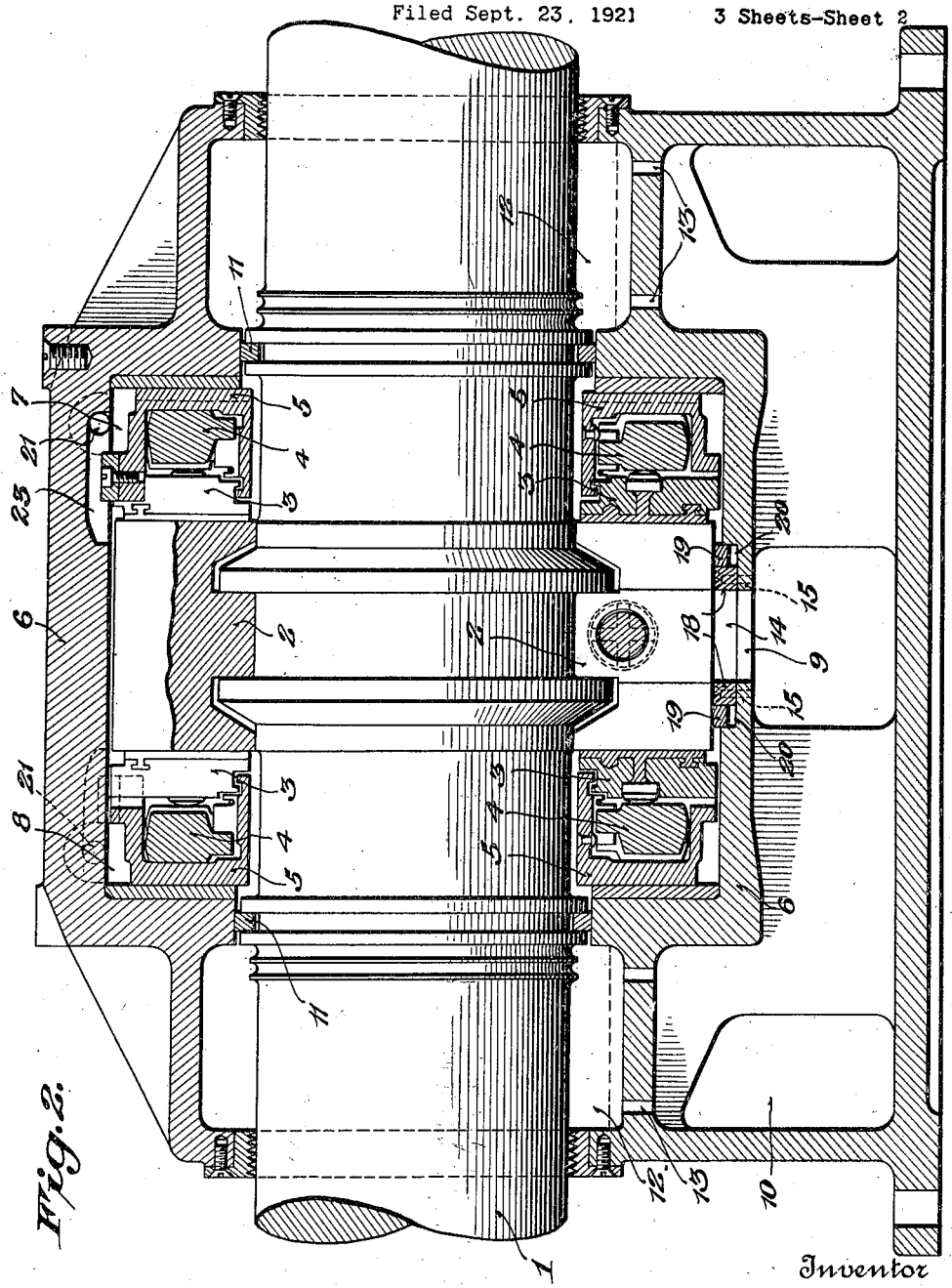
Fig. 2 is an axial section, partly in elevation, of the bearing shown in Fig. 1.

In the form shown in Figs. 1 and 2, 1 is a horizontal or inclined shaft provided with a thrust collar 2 of any suitable construction and mounted thereon in any suitable way. Cooperating with one or both faces of said thrust collar 2 are bearing members of any suitable construction; in the form shown each of said bearing members comprises a plurality of bearing segments or shoes 3 of any suitable construction tiltably mounted in any suitable way on equalizing means of any suitable construction, the latter being illustrated as composed of a series of overlapping, tiltable equalizing plates or blocks 4, constituting a substantially-continuous but subdivided flexible ring, mounted in a channel-shaped base ring 5. As the details of construction of the bearing members and the means for mounting the same constitute no part of the present invention, further description thereof is deemed unnecessary.

Surrounding the thrust collar 2 is a bearing housing 6 of any suitable construction, the same being shown as extending on either side of said thrust collar to provide chambers 7 and 8 in which the bearing members are disposed. It is to be expressly understood, however, that, while the bearing illustrated is adapted to take thrust in both directions and is therefore provided with bearing members cooperating with both faces of the thrust collar, the invention is not limited thereto and, if the bearing is to take thrust in only one direction, only one stationary bearing member will be provided for cooperation with the proper face of the thrust collar.

Communicating through a passage 9 with the annular space between the periphery of the thrust collar 2 and the inner face of the housing 6 is an oil-well 10 of any suitable construction. In the form shown, said oil-well is formed integrally with the bearing housing 6 and disposed in the base of the latter, and said passage 9 is provided as an aperture through the cylindrical wall 6 of said housing. The oil is maintained in said oil-well at such a level that it will flow through the passage 9 into the lower portion of the annular space between the periphery of the thrust collar 2 and the housing 6, but the level of the oil in said well is preferably maintained below the level of the shaft so that there is no tendency for the oil to leak out of the housing along the shaft when the shaft is stationary. To minimize leakage of oil along the shaft when the bearing is in operation sealing rings 11 may be suitably provided between the housing 6 and shaft 1 at the outer ends of the chambers 7 and 8 and, to collect any oil which does leak past said sealing rings 11, the housing may be provided with oil-collecting chambers 12 at the outer sides of said sealing rings. Said oil-collecting chambers 12 may be closed at their outer ends by packing glands of any suitable construction, and the oil which collects in said chambers may be returned to the oil well in any suitable way, as by the passages 13 formed in the wall separating said chambers from the oil well 10.

In conformity with the present invention, means are provided between the periphery of the thrust collar 2 and the surrounding wall of the housing 6 whereby the thrust collar as it rotates over the opening or passage 9 will create a suction that will draw oil from the oil well 10 and deliver it to the chambers 7 and 8. Said means may be of any suitable construction and may take a variety of forms. The embodiment shown in Figs. 1 and 2 is suitable for use where the shaft is designed to rotate in one direction only, and comprises a barrier member 14 suitably mounted on the housing wall 6, as by screws 15, and substantially filling the space in a radial direction between the periphery of the thrust collar 2 and said housing wall 6 on that side of the passage 9 toward which the thrust collar rotates. Said barrier member 14 may be made of any suitable material, but is preferably composed of babbitt or other soft metal so that it may engage the periphery of the thrust collar. Said barrier member 14 therefore divides the annular space between the periphery of the thrust collar 2 and the housing wall 6 into two portions; the portion 16 of said space on the side of the passage 9 away from which the thrust collar is rotating being in communication with the oil well through the passage 9 and the portion 17 of said space on the opposite side of said passage 9 being shut off from said first-named portion 16. Said portion 16 therefore constitutes a suction chamber whereby the thrust collar as it rotates past the barrier 14 tends to create a suction in said portion 16 of said annular space and draw the oil through the passage 9 into said chamber.

In order to increase the suction in the portion 16 of said annular space, means of any suitable construction may be provided for separating a smaller or larger part of said space 16 from the chamber or chambers in which the bearing members are disposed. To this end, the barrier member 14, in the form shown in Figs. 1 and 2, is provided with arms 18 which are adapted to extend on either side of the passage 9 and fill the space in a radial direction between the periphery of the thrust collar and the housing wall 6. In place of arms 18 formed as a part of the barrier member 14, or in conjunction therewith, a section of a sealing ring 19 may be suitably mounted in a groove 20 in the housing wall 6 on each side of the passage 9 and extend to any desired length in contact with the periphery of the thrust collar, or any other suitable means, as annular ribs on the housing wall 6, may be provided if desired.

The oil pumped by the rotation of the thrust collar into the peripheral space 16 is delivered to the bearing chambers 7 and 8 and fills the latter to a greater or less extent depending upon the speed of rotation of the shaft, the proximity of the housing wall 6 to the periphery of the thrust collar 2 and the length of the suction chamber provided by the use of the arms 18 or the sealing rings 19 or other suitable means. In order that the bearing chambers 7 and 8 may be kept full of oil when the bearing is in operation, so that the bearing members will run immersed in oil, the housing wall 6 is preferably in close proximity to the periphery of the thrust collar 2 and the sealing rings 19 are preferably so extended as to insure that the chambers 7 and 8 will be kept full of oil when the thrust collar is rotating. If desired, however, these parts may be so designed that the bearing chambers 7 and 8 will not only be maintained full of oil, but the oil in said chambers will be maintained under a pressure, whereby a more rapid circulation of the oil through said chambers may be obtained, or the pressure head may be utilized for causing circulation of the oil through an oil-cooling device or one or more guide bearings or both. In the form illustrated in Figs. 1 and 2, the chambers 7 and 8 have outlets 21 communicating with piping 22, or passages formed in the wall of the housing if preferred, through which the oil may be returned to the oil well 10, as shown, or conveyed to an oil-cooling device or one or more guide bearings or both. To facilitate venting of the air in said chambers 7 and 8, and the flow of oil therethrough, by-passes 23, shown as enlarged key ways co-operating with the keys on the base rings 5, afford intercommunication between the annular spaces adjacent said base ring.

Figure 3:
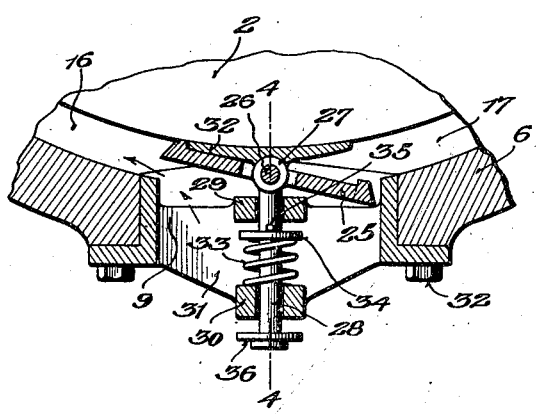
Fig. 3 is a fragmentary transverse section of another embodiment of the present invention.
Figure 4:
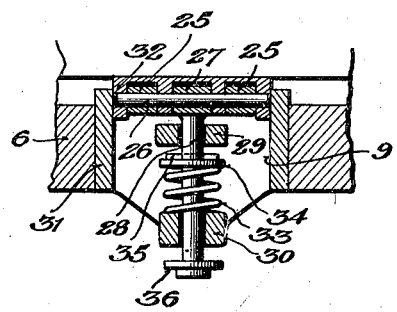
Fig. 4 is a section on the line 4—4 of Fig. 3.

In the embodiment of the invention shown in Figs. 3 and 4, a construction is illustrated which is suitable for use when the shaft may rotate in either direction, said embodiment comprising means for automatically shutting off the portion of the annular space between the periphery of the thrust collar and the housing on the side of the passage 9 toward which the thrust collar is rotating from the portion of said annular space on the opposite side of said passage, in whichever direction the thrust collar may rotate. In the form shown, said means takes the form of a valve member 25 pivotally mounted by a pintle 26 on the head 27 of a pin 28 that may reciprocate vertically in the brackets 29 and 30 of a sleeve-like frame member 31 suitably mounted, as by bolts or screws 32, in an opening in the housing wall 6 and providing the passage 9 therethrough. Said pin 28 also carries on the pintle 26 a shoe 32 adapted to engage the periphery of the thrust collar, the same being urged into resilient engagement with said periphery by a coil spring 33 acting between said bracket 30 and a collar 34 retained on said pin 28 by a cotter pin 35. Said pin 28 is also preferably provided with a second collar 36 to limit the extent to which the shoe 32 and valve member 25 may be moved by the spring 33.

The valve member 25 is of such size as to substantially fill the passage 9 when normal to the axis of said passage. When the thrust collar is rotating in a clockwise direction, however, the flow of oil induced thereby tilts said member 25 on its pivotal axis 26 so as to permit the flow of oil through the passage 9 into the portion 16 of the annular space between the periphery of the thrust collar 2 and the housing wall 6 on that side of the passage 9 away from which the thrust collar is rotating, said member 25 at the same time substantially shutting off the portion 17 of said annular space on the opposite side of said passage 9. If the direction of rotation of the shaft be reversed, on the other hand, the thrust collar 2 tends to draw oil into the portion 17 of said annular space and the flow of oil tilts the member 25 so as to permit said flow into said portion 17, said member 25 simultaneously substantially shutting off the portion 16 of said annular space on the opposite side of the passage 9.

Said member 25 therefore constitutes an automatically reversible valve member for substantially shutting off the annular space between the periphery of the thrust collar 2 and the bearing housing 6 on that side of the passage 9 toward which the thrust collar is rotating and simultaneously opening the portion of said annular space on the opposite side of said passage, which constitutes a suction chamber, to permit the flow of oil thereinto, in whichever direction the shaft may rotate.

As in the embodiment of Figs. 1 and 2, the suction chamber may be extended by the provision of sealing rings or other suitable means on both sides of the passage 9 and between the periphery of the thrust collar 2 and the housing wall 6, said sealing rings extending circumferentially on either side of said passage 9, however, so as to provide said suction chambers for either direction of shaft rotation.

Figure 5:
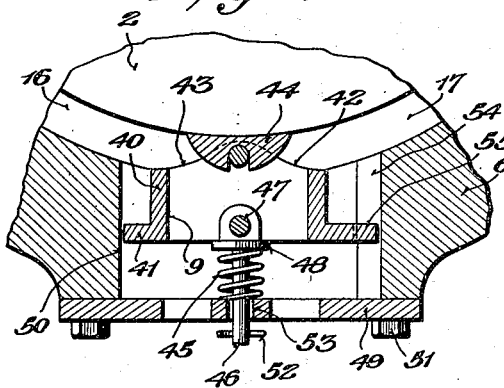
Fig. 5 is a fragmentary transverse section of another embodiment of the present invention, the parts being shown in an intermediate position.
Figure 6:
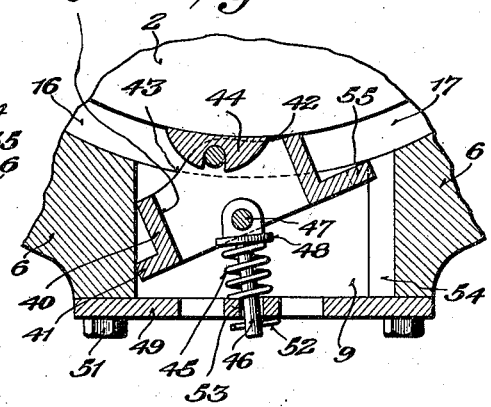
Fig. 6 is a corresponding section of the embodiment shown in Fig. 5 with the parts in the position which they assume for a clockwise rotation of the shaft.

In the embodiment of the invention shown in Figs. 5 and 6, the valve member is provided with means whereby it is automatically moved into adjusted position by the rotation of the thrust collar. In the form shown, the valve member comprises a sleeve-like element 40 providing the passage 9 therethrough and having a flange 41 at one end. The opposite end of said valve member 40 is curved in either direction from a plane extending axially of the bearing so as to provide two arcuate edges 42 and 43 adapted to engage the periphery of the thrust collar (see Fig. 6) and substantially shut off the portion of the annular space between the periphery of said collar and the housing wall 6 on that side of the passage 9 toward which the thrust collar is rotating.

Pivotally mounted on the valve member 40 is a shoe 44 adapted to engage the periphery of the thrust collar 2. Said valve member 40 and shoe 44 are resiliently urged into engagement with the periphery of the thrust collar by a coil spring 45 mounted on a pin 46 pivotally attached to the member 40 at 47 and acting between a collar 48 on said pin and a bracket plate 49 suitably mounted over an opening 50 in the housing wall 6, as by bolts or screws 51. A cotter pin 52 is preferably mounted in the pin 46 to prevent said pin being forced through the aperture 53 by said coil spring 45. To prevent rotation of the valve member around its own axis the side of the opening 50 is shown as provided with a keyway 54, and a projection 55 on the flange 41 engages in said keyway 54 and prevents rotational displacement of the member 40.

When the valve member is in intermediate position the parts assume the position shown in Fig. 5 and the shoe 44 is pressed against the periphery of the thrust collar by the coil spring 45. If the thrust collar begins to rotate in a clockwise direction, the shoe 44 tends to move with the periphery of the thrust collar owing to the friction therebetween, and the valve member 40 is tilted into the position shown in Fig. 6 with its edge 42 engaging the periphery of said thrust collar. In this position oil may flow through the passage 9 afforded by the aperture in said sleeve-like valve member 40 and into the portion 16 of the annular space between the periphery of the thrust collar 2 and the housing wall 6 on the suction side of said valve member. At the same time, the valve member 40 substantially closes off the portion 17 of the annular space between the periphery of the thrust collar 2 and the housing wall 6 on the opposite side of said passage 9. If the direction of rotation of the thrust collar be reversed, however, the shoe 44 moves with the thrust collar until the valve member 40 is tilted into the opposite position with its edge 43 in engagement with the periphery of the thrust collar. Now the oil may flow from the passage 9 into the portion 17 of said annular space on the suction side of said passage 9 and the portion 16 of said annular space is substantially shut off from said passage 9.

As in the embodiment of Figs. 3 and 4 the suction chamber at each side of the passage 9 may be extended by the use of sealing rings 19 or other suitable means and, to accommodate the rotation of the thrust collar in either direction, said sealing rings will preferably extend on both sides circumferentially of said passage 9. It will also be observed that the tilting of the valve member 40 in the embodiment of the invention shown in Figs. 5 and 6 will be aided by the flow of oil induced by the rotation of the thrust collar.

It will therefore be perceived that a horizontal or inclined thrust bearing has been provided with means whereby the rotation of the thrust collar creates a suction that will draw oil from an oil well in which the level of the oil is maintained below the level of the shaft, and deliver said oil to one or more chambers in which bearing members are disposed, to maintain said chamber or chambers partly or entirely full of oil and also, if desired, to maintain the oil in said chamber or chambers under a head whereby a more rapid circulation of oil through said chambers may be obtained, or the oil may be circulated through an oil-cooling device or one or more guide bearings or both. Moreover, means of the character just described has been provided which is available for use with either direction of shaft rotation and which is automatically actuated by the flow of oil induced by the rotation of the thrust collar or by the direction of rotation of the thrust collar or by both to assume the proper position with respect to said collar in whichever direction the latter may rotate.

While the embodiments of the invention illustrated on the drawings have been described with considerable particularity it is to be expressly understood that the invention is not limited thereto as the same is capable of receiving a variety of mechanical expressions, some of which will now readily suggest themselves to those skilled in the art. Furthermore, certain features may be used without other features thereof and changes may be made in the details of construction, arrangement, proportion and location of parts without departing from the spirit of this invention. Reference is therefore to be had to the claims hereto appended for a definition of the limits of said invention, it being understood that the term "horizontal thrust bearing" as used therein is to be construed as generic to bearings for inclined shafts.

What is claimed is:

1. In a horizontal thrust bearing, a rotatable thrust collar, one or more bearing members cooperating therewith, a housing surrounding said thrust collar and including one or more chambers in which said bearing members are disposed, an oil well communicating with the space between the periphery of said thrust collar and said housing, and means cooperating with said thrust collar to provide a suction chamber in the space between the periphery of said thrust collar and said housing whereby the suction created by the rotation of said thrust collar will draw oil from said oil well into said chamber or chambers.

2. In a horizontal thrust bearing, a rotatable thrust collar, one or more bearing members cooperating therewith, a housing surrounding said thrust collar and including one or more chambers in which said bearing members are disposed, an oil well communicating with the space between the periphery of said thrust collar and said housing through a passage in the latter, and means cooperating with the periphery of said thrust collar for separating the portion of the space between said collar and housing at the suction side of said passage from the portion of said space at the opposite side of said passage.

3. In a horizontal thrust bearing, a rotatable thrust collar, one or more bearing members cooperating therewith, a housing surrounding said thrust collar and including one or more chambers in which said bearing members are disposed, an oil well communicating with the space between the periphery of said thrust collar and said housing through a passage in the latter, and a barrier in the space between the periphery of said thrust collar and said housing on that side of said passage toward which the thrust collar is rotating.

4. In a horizontal thrust bearing, a rotatable thrust collar, one or more bearing members cooperating therewith, a housing surrounding said thrust collar and including one or more chambers in which said bearing members are disposed, an oil well communicating with the space between the periphery of said thrust collar and said housing through a passage in the latter, a barrier in the space between the periphery of said thrust collar and said housing on that side of said passage toward which the thrust collar is rotating, and means extending from said barrier on either side of said passage in the direction in which the thrust collar is rotating to provide a suction chamber with which said passage communicates.

5. In a horizontal thrust bearing, a rotatable thrust collar, one or more bearing members cooperating therewith, a housing surrounding said thrust collar and including one or more chambers in which said bearing members are disposed, an oil well communicating with the space between the periphery of said thrust collar and said housing through a passage in the latter, and a member between the periphery of said thrust collar and said housing whereby a suction chamber is formed between the periphery of said thrust collar and said housing on that side of said passage away from which said thrust collar is rotating.

6. In a horizontal thrust bearing, a rotatable thrust collar, one or more bearing members cooperating therewith, a housing surrounding said thrust collar and including one or more chambers in which said bearing members are disposed, an oil well communicating with the space between the periphery of said thrust collar and said housing through a passage in the latter, and a member between the periphery of said thrust collar and said housing separating the portion of said space on that side of said passage toward which the collar is rotating from the portion of said space on that side of said passage away from which the collar is rotating.

7. In a horizontal thrust bearing, a rotatable thrust collar, one or more bearing members cooperating therewith, a housing surrounding said thrust collar and including one or more chambers in which said bearing members are disposed, means cooperating with the periphery of said thrust collar and said housing for dividing the space between said elements into two portions, and an oil well communicating with the space between said elements adjacent said means and on the suction side thereof.

8. In a horizontal thrust bearing, a rotatable thrust collar, one or more bearing members cooperating therewith, a housing surrounding said thrust collar and including one or more chambers in which said bearing members are disposed, means cooperating with said thrust collar to provide a suction chamber at one side of said means, and an oil well communicating with said suction chamber.

9. In a horizontal thrust bearing, a rotatable thrust collar, one or more bearing members cooperating therewith, a housing surrounding said thrust collar and including one or more chambers in which said bearing members are disposed, a member cooperating with the periphery of said thrust collar to provide a suction chamber between said periphery and said housing, and an oil well communicating with said suction chamber.

10. In a horizontal thrust bearing, a rotatable thrust collar, one or more bearing members cooperating therewith, a housing surrounding said thrust collar and including one or more chambers in which said bearing members are disposed, a member cooperating with the periphery of said thrust collar and providing a suction chamber between said periphery and said housing, means between said periphery and said housing for extending the length of said suction chamber, and an oil well communicating with said suction chamber.

11. In a horizontal thrust bearing, a rotatable thrust collar, one or more bearing members cooperating therewith, a housing surrounding said thrust collar and including one or more chambers in which said bearing members are disposed, a member cooperating with the periphery of said thrust collar and providing a suction chamber between said periphery and said housing, resilient means for pressing said member against said periphery, and an oil well communicating with said suction chamber.

12. In a horizontal thrust bearing, a rotatable thrust collar, one or more bearing members cooperating therewith, a housing surrounding said thrust collar and including one or more chambers in which said bearing members are disposed, a member cooperating with the periphery of said thrust collar and adapted to provide a suction chamber between said periphery and said housing on one side of said member or the other as said thrust collar rotates in one direction or the other, and an oil well communicating with said suction chamber.

13. In a horizontal thrust bearing, a rotatable thrust collar, one or more bearing members cooperating therewith, a housing surrounding said thrust collar and including one or more chambers in which said bearing members are disposed, a member cooperating with the periphery of said thrust collar and adapted to provide a suction chamber between said periphery and said housing, said member being automatically reversible as the direction of rotation of said thrust collar is reversed, and an oil well communicating with said suction chamber.

14. In a horizontal thrust bearing, a rotatable thrust collar, one or more bearing members cooperating therewith, a housing surrounding said thrust collar and including one or more chambers in which said bearing members are disposed, a member cooperating with the periphery of said thrust collar and adapted to be moved automatically by the flow of oil to provide a suction chamber between said periphery and said housing on one side or the other of said member as said thrust collar rotates in one direction or the other, and an oil well communicating with said suction chamber.

15. In a horizontal thrust bearing, a rotatable thrust collar, one or more bearing members cooperating therewith, a housing surrounding said thrust collar and including one or more chambers in which said bearing members are disposed, a member cooperating with the periphery of said thrust collar and adapted to be moved automatically by the rotation of said thrust collar to provide a suction chamber on one side or the other of said member as said thrust collar rotates in one direction or the other, and an oil well communicating with said suction chamber.

16. In a horizontal thrust bearing, a rotatable thrust collar, one or more bearing members cooperating therewith, a housing surrounding said thrust collar and including one or more chambers in which said bearing members are disposed, an oil well communicating through a passage in said housing with the space between the periphery of said thrust collar and said housing, and means to substantially shut off the portion of said space on that side of said passage toward which said thrust collar is rotating in whichever direction said thrust collar rotates.

17. In a horizontal thrust bearing, a rotatable thrust collar, one or more bearing members cooperating therewith, a housing surrounding said thrust collar and including one or more chambers in which said bearing members are disposed, an oil well communicating through a passage in said housing with the space between the periphery of said thrust collar and said housing, and means automatically operated by the movement of the oil to substantially shut off the portion of said space on that side of said passage toward which said thrust collar is rotating in whichever direction said thrust collar rotates.

18. In a horizontal thrust bearing, a rotatable thrust collar, one or more bearing members cooperating therewith, a housing surrounding said thrust collar and including one or more chambers in which said bearing members are disposed, an oil well communicating through a passage in said housing with the space between the periphery of said thrust collar and said housing, and means automatically operated by the rotation of said thrust collar to substantially shut off the portion of said space on that side of said passage toward which said thrust collar is rotating in whichever direction said thrust collar rotates.

19. In a horizontal thrust bearing, a rotatable thrust collar, one or more bearing members cooperating therewith, a housing surrounding said thrust collar and including one or more chambers in which said bearing members are disposed, an oil well communicating through a passage in said housing with the space between the periphery of said thrust collar and said housing, and means to substantially shut off the portion of said space on that side of said passage toward which said thrust collar is rotating in whichever direction said thrust collar rotates, said means comprising a valve member adapted to be adjusted into one position or the other as said thrust collar rotates in one direction or the other.

20. In a horizontal thrust bearing, a rotatable thrust collar, one or more bearing members cooperating therewith, a housing surrounding said thrust collar and including one or more chambers in which said bearing members are disposed, an oil well communicating through a passage in said housing with the space between the periphery of said thrust collar and said housing, and means to substantially shut off the portion of said space on that side of said passage toward which said thrust collar is rotating in whichever direction said thrust collar rotates, said means comprising a valve member adapted to be adjusted into one position or the other as said thrust collar rotates in one direction or the other, and resilient means for urging said valve member into cooperative relation with said thrust collar.

21. In a horizontal thrust bearing, a rotatable thrust collar, one or more bearing members cooperating therewith, a housing surrounding said thrust collar and including one or more chambers in which said bearing members are disposed, an oil well communicating through a passage in said housing with the space between the periphery of said thrust collar and said housing, and means to substantially shut off the portion of said space on that side of said passage toward which said thrust collar is rotating in whichever direction said thrust collar rotates, said means comprising a valve member and a second member engaging said thrust collar and adapted to be moved thereby to adjust said valve member into one position or the other as said thrust collar rotates in one direction or the other.

22. In a horizontal thrust bearing, a rotatable thrust collar, one or more bearing members cooperating therewith, a housing surrounding said thrust collar and including one or more chambers in which said bearing members are disposed, an oil well communicating through a passage in said housing with the space between the periphery of said thrust collar and said housing, and means to substantially shut off the portion of said space on that side of said passage toward which said thrust collar is rotating in whichever direction said thrust collar rotates, said means comprising a valve member, a second member engaging said thrust collar and adapted to be moved thereby to adjust said valve member into one position or the other as said thrust collar rotates in one direction or the other, and resilient means for urging said valve member into engagement with said thrust collar.

23. In a horizontal thrust bearing, a rotatable thrust collar, one or more bearing members cooperating therewith, a housing surrounding said thrust collar and including one or more chambers in which said bearing members are disposed, said housing having a passage communicating with the space between the periphery of said thrust collar and said housing, valve mechanism for permitting the flow of oil from said passage to the portion of said space on the suction side of said passage and substantially shutting off the portion of said space on the opposite side of said passage, and an oil well communicating with said passage.

24. In a horizontal thrust bearing, a rotatable thrust collar, one or more bearing members cooperating therewith, a housing surrounding said thrust collar and including one or more chambers in which said bearing members are disposed, said housing having a passage communicating with the space between the periphery of said thrust collar and said housing, valve mechanism for permitting the flow of oil from said passage to the portion of said space on that side of said passage away from which the thrust collar is rotating in whichever direction said thrust collar rotates, said valve mechanism also being adapted to substantially shut off the portion of said space on the opposite side of said passage, and an oil well communicating with said passage.

25. In a horizontal thrust bearing, a rotatable thrust collar, one or more bearing members cooperating therewith, a housing surrounding said thrust collar and including one or more chambers in which said bearing members are disposed, said housing having a passage communicating with the space between the periphery of said thrust collar and said housing, valve mechanism for permitting the flow of oil from said passage to the portion of said space on that side of said passage away from which the thrust collar is rotating in whichever direction said thrust collar rotates, said valve mechanism being automatically operated by the flow of oil induced by said thrust collar and adapted to simultaneously substantially shut off the portion of said space on the opposite side of said passage, and an oil well communicating with said passage.

26. In a horizontal thrust bearing, a rotatable thrust collar, one or more bearing members cooperating therewith, a housing surrounding said thrust collar and including one or more chambers in which said bearing members are disposed, said housing having a passage communicating with the space between the periphery of said thrust collar and said housing, valve mechanism for permitting the flow of oil from said passage to the portion of said space on that side of said passage away from which the thrust collar is rotating, said valve mechanism being adapted to simultaneously substantially shut off the portion of said space on the opposite side of said passage and automatically operated by the rotation of said thrust collar, and an oil well communicating with said passage.

27. In a horizontal thrust bearing, a rotatable thrust collar, one or more bearing members cooperating therewith, a housing surrounding said thrust collar and including one or more chambers in which said bearing members are disposed, an oil well communicating through a passage in said housing with the space between the periphery of said thrust collar and said housing, and means to substantially shut off the portion of said space on that side of said passage toward which said thrust collar is rotating in whichever direction said thrust collar rotates, said means comprising a valve member mounted to be moved into one position or the other by the flow of oil induced by the rotation of said thrust collar.

28. In a horizontal thrust bearing, a rotatable thrust collar, one or more bearing members cooperating therewith, a housing surrounding said thrust collar and including one or more chambers in which said bearing members are disposed, an oil well communicating with the space between the periphery of said thrust collar and said housing, and means cooperating with the periphery of said thrust collar whereby the suction created by the rotation of said thrust collar will draw oil from said well into said chamber or chambers.

29. In a horizontal thrust bearing, a rotatable thrust collar, one or more bearing members cooperating therewith, a housing surrounding said thrust collar and including one or more chambers in which said bearing members are disposed, an oil well communicating through a passage in said housing with the space between the periphery of said collar and said housing, and means cooperating with the periphery of said thrust collar whereby the suction created by the rotation of said thrust collar is applied only to draw oil through said passage.

30. In a horizontal thrust bearing, a rotatable thrust collar, one or more bearing members cooperating therewith, a housing surrounding said thrust collar and including one or more chambers in which said bearing members are disposed, an oil well communicating with the space between the periphery of said collar and said housing, and means interposed between the periphery of said thrust collar and said housing whereby the suction created by the rotation of said thrust collar will draw oil from said well into said chamber or chambers.

31. In a horizontal thrust bearing, a rotatable thrust collar, one or more bearing members cooperating therewith, a housing surrounding said thrust collar and including one or more chambers in which said bearing members are disposed, an oil well communicating through a passage in said housing with the space between the periphery of said collar and said housing, and means comprising circumferentially-extending members between the periphery of said thrust collar and said housing on either side of said passage whereby suction created by the rotation of said thrust collar will draw oil from said well into said chamber or chambers.

In testimony whereof I have signed this specification.

HARRY A. S. HOWARTH.